Sept. 29, 1936.    C. H. ROGERS    2,055,775
VEHICLE BRAKING MECHANISM
Filed Jan. 17, 1933    2 Sheets-Sheet 1
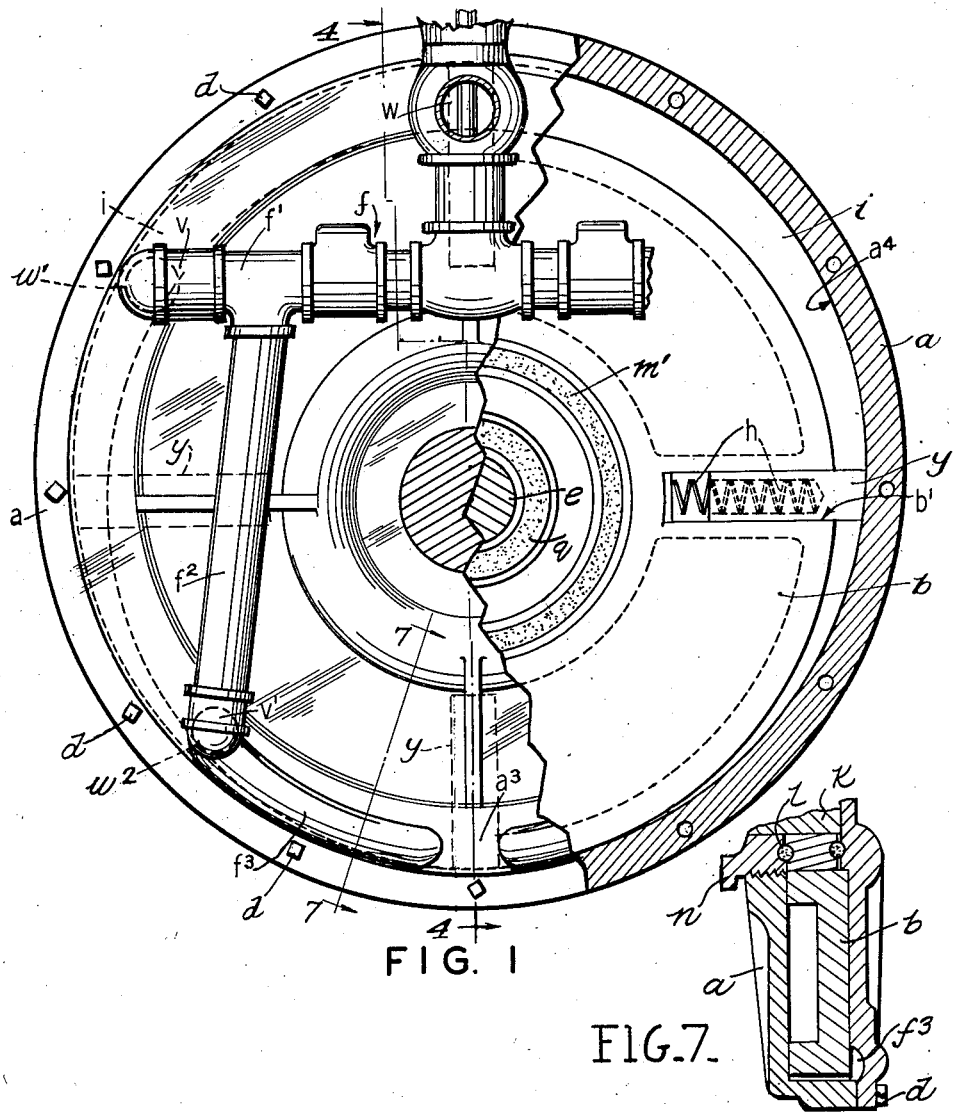
FIG. 1
FIG. 7
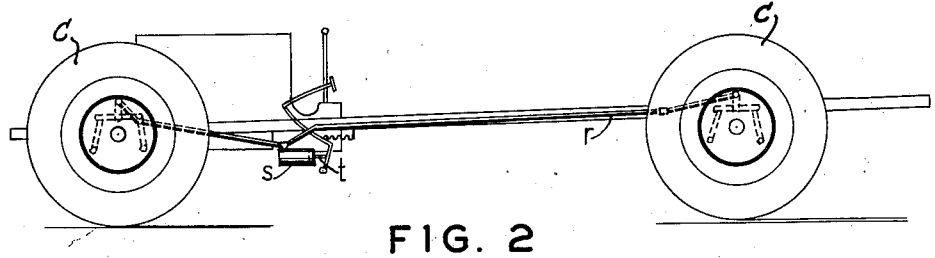
FIG. 2
INVENTOR
CLIFFORD H. ROGERS
BY
ATTORNEY Sept. 29, 1936.    C. H. ROGERS    2,055,775
VEHICLE BRAKING MECHANISM
Filed Jan. 17, 1933    2 Sheets-Sheet 2
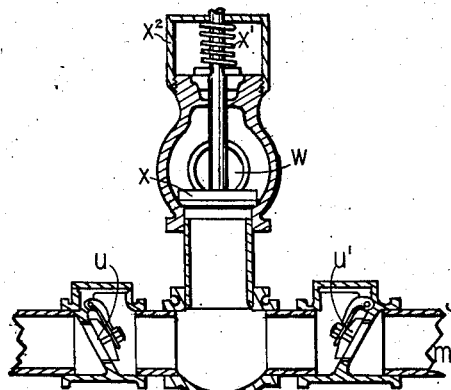
FIG. 3
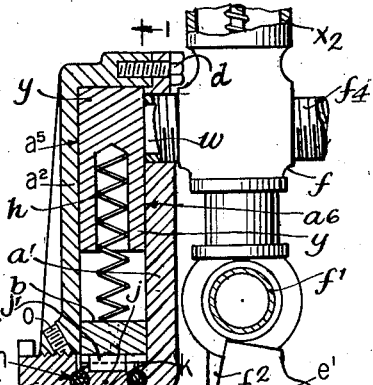
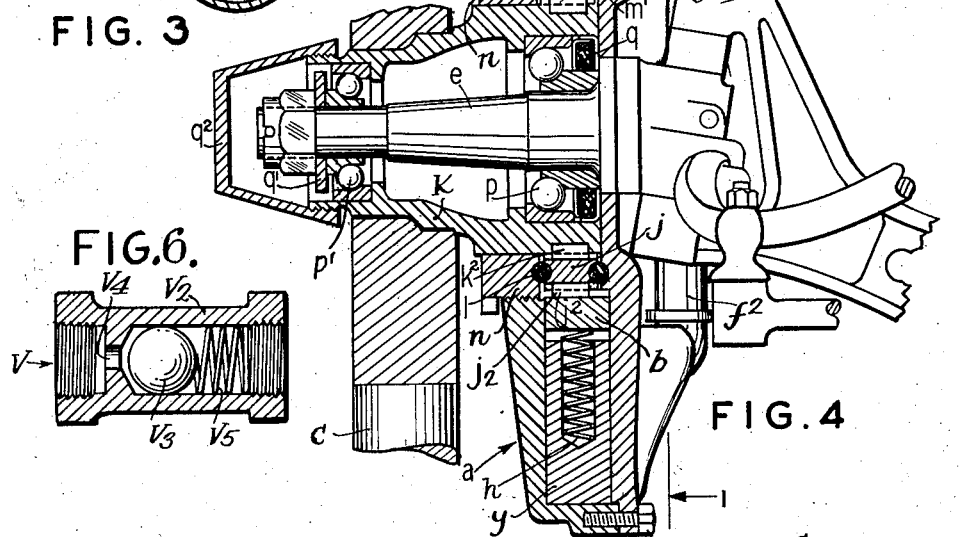
FIG.6.
FIG.4
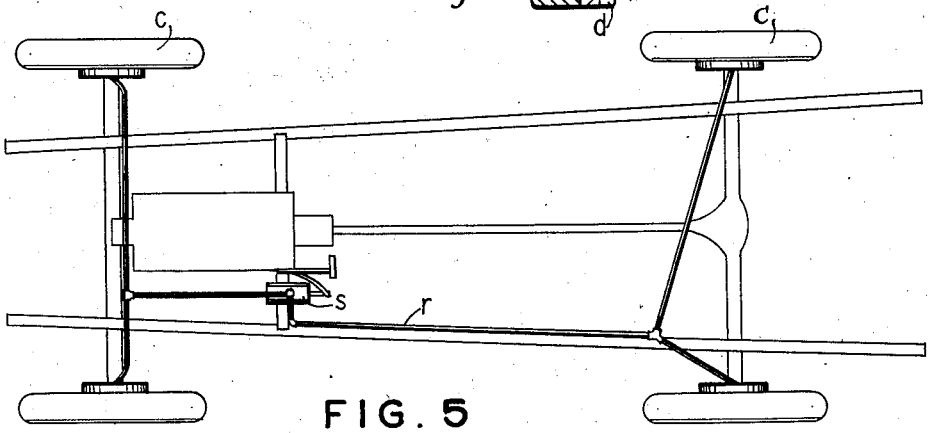
FIG. 5
INVENTOR
CLIFFORD H. ROGERS
BY
ATTORNEY Patented Sept. 29, 1936

2,055,775

UNITED STATES PATENT OFFICE 2,055,775

VEHICLE BRAKING MECHANISM

Clifford H. Rogers, Portland, Oreg., assignor of twenty-four per cent to John Kaufman and twenty-four per cent to J. K. Carr, both of Portland, Oreg.

Application January 17, 1933, Serial No. 652,163

15 Claims. (Cl. 188—90)

My invention relates to vehicle braking apparatus and particularly to the type provided with fluid pumping elements secured to the running gear and adapted to be operated by the latter. Said pumping elements discharge into a conduit defining a closed circuit and each element thus recirculates fluid thru its casing and said conduit.

The object of my invention is to provide vehicle braking apparatus of this character with control devices adapted to remove, or permit the discharge of the fluid from said pumping elements and the conduits associated therewith in measured or predetermined amounts and thus regulate the quantity of fluid circulated.

A further object of my invention is to provide braking elements of this character which have a capacity substantially in excess of the capacity of the closed conduits associated therewith and thus if said pumping elements contain a full capacity of fluid, said conduits impose a substantial obstruction to circulating flow of said liquid and impede the vehicle's progress substantially. To conduits of this character, I provide spring-seated valves tending to obstruct the flow of liquid thru said conduits and adapted to seat in the presence of predetermined minimum pressure. Thus, inasmuch as the pumping elements are driven by the running gear of the vehicle, said valves will tend to lock the wheels and bring the vehicle to an absolute standstill when the vehicle attains a predetermined minimum speed, as when approaching a stop. Thus said braking apparatus will tend to prevent said wheels from locking and skidding until said vehicle has slowed down to a minimum speed at which skidding will not produce damage.

The details of construction and operation of my invention are hereinafter described with reference to the accompanying drawings, in which:

Fig. 1 is a view taken substantially on the line 1—1 in Fig. 4, a portion of this section showing the external rear surface of the pump casing and a portion being shown broken away to disclose details of the interior of said casing with the rotor and associated mechanism housed therein;

Fig. 2 is a diagrammatic elevation of the chassis of an automobile with the feed lines and control mechanism of my improved vehicle braking device shown therein;

Fig. 3 is a fragmentary sectional view of a portion of the valved conduit associated with the pump elements;

Fig. 4 is a section taken substantially on the line 4—4 in Fig. 1 except that the vane is shown in section for the sake of clearness;

Fig. 5 is a diagrammatic plan view of the automobile chassis shown in Fig. 2 with the feed lines and control mechanism superimposed thereon;

Fig. 6 is a detailed sectional view of one of the check valves arranged adjacent one of the discharge ports; and Fig. 7 is a detailed sectional view taken on line 7—7 in Fig. 1.

My invention embodies a casing $a$ adapted to be secured to the frame, or some other fixed part of a vehicle. Said casing houses a rotor $b$ operatively secured to an automobile wheel $c$, or some other part of the running gear of a vehicle. Said casing is divided into halves $a'$ and $a2$ secured together by bolts or cap screws $d$. One brake assembly or pumping element is shown in Fig. 4 as it would be mounted upon a front wheel of an automobile. In such installation the stub shaft $e$ is pivotally mounted between the forked ends of the front axle $e'$ in the usual manner.

Inasmuch as the rotor of each brake assembly or pumping element is operatively secured to some portion of the running gear of a vehicle, it is necessary that said pumping element be made reversible so that it will be effective to stop the progress of a vehicle when it is running either forwardly or backwardly. The rotor $b$ is eccentrically mounted within the casing and said rotor is substantially smaller in diameter than the bore of said casing. One portion of the rotor has a sliding fit with the casing and thus there is formed about said rotor and within said casing a crescent-shaped aperture $i$. Diametrically opposing said portion which has a bearing fit in said casing is an intake port or aperture $w$, which extends thru the casing and enters the crescent-shaped aperture $i$.

A closed conduit $f$ joins said intake port with the plurality of discharge ports $w'$ and $w2$ spaced circularly about the casing and communicating with said aperture $i$. In Fig. 1, I show two discharge ports $w^1$ and $w^2$ at each side of said intake port $w$ and branched pipes $f'$ and $f2$ join together and communicate with said port $w$ and extend to each side of said crescent-shaped aperture. The pipes $f'$ enter the casing and communicate thru discharge ports $w'$ with said aperture at points substantially 60° removed from the intake port $w$, and the pipes $f2$ enter said aperture thru discharge ports $w2$ and extend into said casing at points approximately 120° therefrom. Communicating with the mouth of the pipes $f2$ and overlying the aperture a substantial distance and including the portions adjacent the spot where the rotor bears against the casing are arcuate slots $f3$. As has been pointed out, all of these structures are arranged at each side of said brake assemblies and pumping elements so as to produce a reversible unit. The arcuate channels at each side are spaced apart leaving a section of the casing $a3$ of substantial breadth overlying the periphery of the rotor where it bears against the casing, as is indicated at $a3$ in Fig. 1. Said section of casing prevents fluid located in said aperture $i$ from being carried about by the operation of said rotor $b$.

Said rotor carries a plurality of extensible vanes $y$ which are arranged in radial slots $b'$ at uniform intervals in said rotor $b$ and are forced outwardly in said slots by coiled springs $h$. Thus the ends of said vanes $y$ are forced outwardly and engage the inner surface or bore $a4$ of the casing and make a fluid-tight joint therewith. The remainder of each of said vanes extending outwardly beyond the periphery of the rotor $b$ also engages the inner casing surfaces $a5$ and $a6$, as is shown in Fig. 4.

It is to be noted that the vanes $y$ are more or less hollow and the springs $h$ are housed therein. Said construction minimizes the depth of the radial slots $b'$ and lessens the tendency for air to be compressed and expelled by the movement of the vanes in their slots thereby to expedite the movement of said vanes therein.

The rotor is mounted eccentrically within the casing, as is shown in Fig. 1, and thus a crescent-shaped aperture $i$ is formed about the periphery of the rotor and within the side walls $a4$, $a5$, and $a6$. Said rotor is located so that said aperture is of maximum width at the top, as is shown in Fig. 1, and it is at this point that the intake port $w$ is arranged. Said aperture diminishes in thickness as it approaches the bottom of the casing and at said bottom the rotor has a sliding fit within said casing and substantially prevents fluid from being carried around by said rotor. There is merely sufficient clearance to permit a small quantity of the fluid used to be carried around by the rotor to lubricate the surfaces of the rotor and the casing.

The rotor is secured to a packing ring $j$ by keys $j'$—$j2$, and said ring $j$ is secured to the hub $k$ by keys $k'$—$k2$, and thus said hub and said rotor rotate as a unit. Annular packing members $l$ are mounted in recesses $m$—$m'$ of similar cross-section in the opposed faces of said packing ring, of the casing, and of a packing nut $n$, respectively. Said packing nut is screw-threaded into said casing and is adapted to be seated tightly in place and to compress said packing to insure a liquid-tight joint and said nut is held in said adjusted position by a set screw $o$. The hub is mounted upon an anti-friction bearing $p$—$p'$ supported by the stub shaft $e$ at spaced points, as is shown in Fig. 4. A compressible washer $q$ serves as a means for retaining lubricant about said stub shaft at one side and a fixed washer $q'$ serves a similar purpose at the other side in connection with the hub cap $q2$.

Preferably one of said pumping elements is arranged upon each of the vehicle wheels $c$, as is shown in Fig. 5, and each of said pumping elements is connected by a feed pipe $r$. All of said feed pipes are supplied by a single cylinder $s$, preferably arranged intermediate said wheels, said cylinder constituting a common reservoir for all of said pumping elements and having a capacity slightly greater than the aggregate of said pumping elements and associated feed pipes. Said feed pipes are preferably inclined continuously upwardly from said cylinder $s$, as is shown in Fig. 2, and thus all of said pipes drain to said cylinder or reservoir. The contents of said cylinder are discharged by a treadle-operated piston $t$, which is preferably spring retracted. Fluid is forced into each of said pumping elements by the operation of said treadle-operated piston and is subtracted from said elements by the reverse motion thereof, which latter motion permits the fluid to flow by gravity into the space displaced by said piston.

To prevent fluid from flowing reversely in the branches $f$—$f'$, check valves $u$—$u'$ are arranged therein. It is to be understood that the pumping elements are reversible and thus although there is but one intake pipe $f4$, as shown in Fig. 4, there are two oppositely-extending discharge pipes, one leading to one side of the pumping element and the other to the opposite side thereof. Also arranged at each side of the intake pipe are check valves $v$—$v'$, one of said check valves being located in one of said diverging pipes and the other in the opposite pipe, as is shown in Fig. 1. As is shown in Fig. 6, the check valve $v$ comprises a shell $v2$ in which is housed a ball check valve $v3$. Said ball check valve is seated in the port $v4$ by a coiled spring $v5$. Thus fluid is permitted to move from the discharge port $w'$ toward the intake port $w$, but reverse flow is prevented. Immediately below the intake port $w$ which communicates with the bore of the pipe $f4$, is a spring-closed valve $x$, which is held seated by the coil spring $x'$. Thus said coil spring acting upon the valve tends to impose a fixed resistance to flow thru the conduit system $f$ and thus when the pressure, tending to force said fluid thru said conduit, is less than a predetermined minimum, depending upon the spring pressure, circulation is prevented and the wheel affected is locked against rotation. The spring is adjustable by a threaded control cap $x2$ shown in Fig. 3, and thus the minimum pressure at which said conduit is closed and circulation prevented, is adjusted over a range determined by adjustment of said spring $x'$.

As has been pointed out heretofore, the capacity of each of the pumping elements substantially exceeds the capacity of the closed conduit $f$ connecting the discharge side with the intake side of each of said pumping elements. Thus if the pumping elements are supplied with sufficient liquid to completely fill the crescent-shaped aperture $i$ therein, the pumping elements can be operated only at a very slow speed and by the application of a substantial force. Correspondingly, when the pumping elements are emptied the rotors revolve easily as said pumping elements have no liquid to displace and the liquid which adheres to the parts preferably serves as a lubricant therefor. The function of the treadle-operated piston $t$ thus is to supply to each of said elements a quantity of oil and the degree to which the treadle is depressed regulates the braking force of each of the rotor elements to the progress of the vehicle. Sufficient liquid is provided so that when the treadle is at rest, as is shown in Figs. 2 and 5, the cylinder is adapted to hold its maximum capacity and said cylinder and the feed pipes $r$ extending therefrom are also filled with liquid. The outlets for said feed pipes to each of the pumping elements lie in the same horizontal plane and thus the liquid approaches, substantially to the same degree, all of the pumping elements. The pumping elements tend to displace their contents in their operation and thus aid in the discharge of liquid from the pump casings and thus supplement the partial vacuum produced by the retraction of the piston in the feed lines, and the inclination of the latter thus removes said liquid under the influence of gravity.

The operating liquid is received at the pump casing from the horizontal section of conduit *f4*, which is arranged in a plane extending substantially thru the highest point of the casing *a* of the pumping elements. Said liquid discharges into the crescent-shaped aperture *i* at substantially its widest point, as is shown in Fig. 1, and would tend to flow equally towards the pointed ends of said crescent-shaped aperture if it were not for the rotation of the radially-extending vanes *y*. When the vehicle operates in a forward direction the vanes turn counter-clockwise when the parts are arranged in the manner shown in Fig. 1. When the vehicle is operated in reverse, they turn relatively clockwise in the casing. The rotation of said vanes tends to compress the operating liquid progressively into a smaller space. When the rotor is turned counter-clockwise and the parts are arranged as is shown in Fig. 1, a portion of the liquid is permitted to escape thru the section *f'* of the conduit and after the vane passes the mouth of the said section the remainder of the fluid in the aperture is forced to discharge thru the branch *f2* thereof.

As has been pointed out, check valves tend to maintain the flow of liquid in one direction and to prevent reverse flow thereof. Thus the discharged liquid is forced to return to the horizontal section *f4* of the closed conduit and to be re-circulated by the pumping element. There is substantial pressure built up within said conduit and if the piston *t* is retracted to lessen the pressure in the feed pipes, a corresponding portion of liquid is removed from circulation to cause uniformity of pressure in said conduit *f*.

As is indicated in Fig. 1 in dotted outline the middle portion of the rotor *h* is hollow, being cored out. This cored portion faces away from the plane of the rotor as viewed in Fig. 1 and opens against the inner face of the casing *a*. When the pumping and braking element is not operated, said cored out portion houses air at atmospheric pressure. When operating fluid is passed to the interior of said casing, the air entrapped within the crescent-shaped aperture is necessarily displaced and a certain portion of the air passes by the side of the rotor and enters said cored out portion thereof. The air entrapped within the cored portion serves as an elastic cushion which tends to resist the flow of the operating fluid into said cored portion. The viscosity of said operating fluid also tends to prevent it from leaking into said cored portion, the operating clearances serving to permit the passage of air under pressure but to resist the passage of the operating fluid which preferably is a somewhat viscous liquid. Said compressed air housed within said cored portion thus aids the pumping action of the vanes, and the partial vacuum induced by the retraction of the control piston, to remove the operating fluid from the casing when said control piston is retracted. The operation of the vanes within the casing effects the major portion of said discharge of operating fluid and thus the fluid is removed from said casing in the main by the action of said vanes after the control piston is retracted by its spring. Inasmuch as the main feed line and the cylinder provides sufficient capacity normally to prevent the fluid from being above the intake point of the casing and said fluid lines drain toward the cylinder, there is no tendency inadvertently to discharge the contents of said line into the casing except when the piston is moved to exhaust said line and to fill the casing. The check valves in each of the discharge lines function to prevent the reverse flow of said fluid into the casing. The main intake pipe preferably extends thru the pump casing at the highest point of the aperture *i* and operating fluid must be forcibly fed thru said pipe to enter said pump casing.

Although I have shown my invention embodied in braking apparatus including four of such units, one unit being attached to each of the wheels of a vehicle, it is apparent that said system is equally adaptable to be applied only to the two rear or driving wheels of a vehicle. These types of brake-installations are commonly made and are standard automobile practice at the present time and the details of said adaptation of my invention will readily be apparent to persons skilled in the art without further description or illustration. The said feed pipe, as is shown in Fig. 4, is arranged adjacent the steering knuckle at the front end of a vehicle and preferably comprises a relatively long section of tubing which has a sufficient factor of flexibility to prevent the necessity of providing swivel joints in said fluid conducting system.

I claim:

1. In vehicle braking mechanism composed of a brake element defining a pumping element of the type adapted to circulate liquid and being operatively connected to the running gear of said vehicle, said brake element comprising a circular casing and a rotor housed therein, said rotor operating about an axis eccentric to the center of said casing and provided with extensible vanes, a closed passageway leading from the point of discharge of said pumping element to the intake thereof, and a reservoir of liquid provided with adjustable means discharging into said casing and subtracting liquid therefrom, whereby the quantity of liquid contained in said casing determining the braking effect exercised by the braking element of which said casing is a part.

2. In vehicle braking mechanism composed of a plurality of brake elements each defining a pumping element of the type adapted to circulate liquid and being operatively connected to the running gear of said vehicle, each brake element comprising a circular casing and a rotor housed therein, said rotor operating about an axis eccentric to the center of said casing and provided with extensible vanes, a closed passageway leading from the point of discharge of each of said pumping elements to the intake thereof, a common reservoir of liquid provided with means discharging into each of said casings, the quantity of liquid contained in said casing determining the braking effect exercised by the braking element of which said casing is a part.

3. In vehicle braking mechanism composed of a brake element defining a pumping element of the type adapted to circulate liquid and being operatively connected to the running gear of said vehicle, said brake element comprising a circular casing and a rotor housed therein, said rotor operating about an axis eccentric to the center of said casing and provided with extensible vanes, a closed passageway leading from the point of discharge of said pumping element to the intake thereof, a reservoir of liquid provided with a pump element, said reservoir discharging into said casing, the quantity of liquid contained in said casing determining the braking effect ex- 4. In vehicle braking mechanism composed of a brake element defining a pumping element of the type adapted to circulate liquid and being operatively connected to the running gear of said vehicle, said brake element comprising a circular casing and a rotor housed therein, said rotor operating about an axis eccentric to the center of said casing and provided with extensible vanes, a closed passageway leading from the point of discharge of said pumping element to the intake thereof, a reservoir of liquid provided with treadle-operated control means, said reservoir discharging into said casing, the quantity of liquid contained in said casing determining the braking effect exercised by the braking element of which said casing is a part.

5. In vehicle braking mechanism composed of a brake element defining a pumping element of the type adapted to circulate liquid and being operatively connected to the running gear of said vehicle, said brake element comprising a circular casing and a rotor housed therein, said rotor operating about an axis eccentric to the center of said casing and provided with extensible vanes, a closed passageway leading from the point of discharge of said pumping element to the intake thereof, means interposing a substantial fixed back pressure resisting flow of liquid thru said passageway, a reservoir of liquid provided with means discharging into said casing, the quantity of liquid contained in said casing determining the braking effect exercised by the braking element of which said casing is a part.

6. In vehicle braking mechanism composed of a brake element defining a pumping element of the type adapted to circulate liquid and being operatively connected to the running gear of said vehicle, said brake element comprising a circular casing and a rotor housed therein, said rotor operating about an axis eccentric to the center of said casing and provided with extensible vanes, a closed passageway leading from the point of discharge of said pumping element to the intake thereof, valves interposing a substantial fixed back pressure resisting flow of liquid thru said passageway, control mechanism for adjusting the degree of said back pressure, a reservoir of liquid provided with means discharging into said casing, the quantity of liquid contained in said casing determining the braking effect exercised by the braking element of which said casing is a part.

7. In vehicle braking mechanism composed of a brake element defining a pumping element of the type adapted to circulate liquid and being operatively connected to the running gear of said vehicle, said brake element comprising a circular casing and a rotor housed therein, said rotor operating about an axis eccentric to the center of said casing and provided with extensible vanes, a closed passageway leading from the point of discharge of said pumping element to the intake thereof, means interposing a substantial fixed back pressure resisting flow of liquid thru said passageway, control mechanism for adjusting the degree of said back pressure, a reservoir of liquid provided with means discharging into said casing, the quantity of liquid contained in said casing determining the braking effect exercised by the braking element of which said casing is a part.

8. In vehicle braking mechanism composed of a plurality of brake elements each defining a pumping element of the type adapted to circulate liquid and being operatively connected to the running gear of said vehicle, each brake element comprising a circular casing and a rotor housed therein, said rotor operating about an axis eccentric to the center of said casing and provided with extensible vanes, a closed passageway leading from the point of discharge of each of said pumping elements to the intake thereof, valves interposing a substantial fixed back pressure resisting flow of liquid thru each of said passageways, control mechanism for adjusting the degree of said back pressure, and a common reservoir of liquid provided with a treadle-operated pump element, said reservoir discharging into each of said casings, the quantity of liquid contained in said casings determining the braking effect exercised by the braking element of which said casing is a part.

9. In braking apparatus for vehicles including a plurality of pumping elements adapted to be connected to the vehicle running gear, each of said pumping elements circulating liquid thru a closed conduit of substantially smaller capacity than said pumping element, a spring-closed valve having a predetermined yield point and arranged in said conduit, each pumping element having a plurality of outlets discharging into said conduit, check valves for preventing flow of liquid in one direction thru said outlets, and means regulating the quantity of liquid introduced into said pumping elements and the conduits with which said elements connect.

10. In vehicle braking mechanism including a braking element adapted to be operatively secured to the vehicle running gear and comprising a pump element provided with a conduit defining a closed path directly connecting the intake side with the discharge side of said pump element, said conduit having a capacity substantially smaller than that of the pump element, means for adding liquid to and subtracting it from said conduits thus varying the quantity of liquid contained in said pump element, and the quantity of liquid contained in and discharged from said pump element being the determining factor producing the braking effect thereof.

11. In vehicle braking mechanism including a plurality of braking elements each adapted to be operatively secured to separate and spaced portions of the vehicle running gear and each of said braking elements comprising a pump element provided with a passageway connecting the intake and discharge sides of said pump element, said passageway having a capacity substantially smaller than that of the pump element, means common to all of said pump elements for progressively varying the quantity of liquid contained in said pump elements, and the quantity of liquid contained in and discharged from said pump elements being the determining factor producing the braking effect thereof.

12. In vehicle braking mechanism including a braking element adapted to be operatively secured to the vehicle running gear and comprising a pump element provided with a passageway connecting the intake and discharge sides of said pump element, said passageway having a capacity substantially smaller than that of the pump element, means for progressively varying the quantity of liquid contained in said pump element, the quantity of liquid contained in and discharged from said pump element being the determining factor producing the braking effect thereof, said means including a reservoir having a capacity exceeding that of said pumping element, whereby said element may have substantially all of its liquid content withdrawn and retained by said reservoir.

13. In vehicle braking mechanism including a plurality of braking elements each adapted to be operatively secured to separate and spaced portions of the vehicle running gear and each of said braking elements comprising a pump element provided with a passageway connecting the intake and discharge sides of said pump element, said passageway having a capacity substantially smaller than that of the pump element, means common to all of said pump elements for progressively varying the quantity of liquid contained in said pump elements, the quantity of liquid contained in and discharged from said pump elements being the determining factor producing the braking effect thereof, said means including a reservoir having a capacity exceeding that of all of said pumping elements, whereby said elements may have substantialy all of their liquid content withdrawn and retained by said reservoir.

14. In vehicle braking mechanism including a braking element adapted to be operatively secured to the vehicle running gear and comprising a pump element provided with a passageway connecting the intake and discharge sides of said pump element, said passageway having a capacity substantialy smaller than that of the pump element, means for progressively varying the quantity of liquid contained in said pump element, and the quantity of liquid contained in and discharged from said pump element being the determining factor producing the braking effect thereof, a yieldingly mounted valve adapted automatically to seat in the presence of a determined minimum pressure in said passageway and to obstruct the flow thru said passageway, said minimum pressure being sufficient to lock the running gear to which said braking element is secured.

15. In vehicle braking mechanism including a plurality of braking elements each adapted to be operatively secured to separate and spaced portions of the vehicle running gear and each of said braking elements comprising a pump element provided with a passageway connecting the intake and discharge sides of said pump element, said passageway having a capacity substantially smaller than that of the pump element, means common to all of said pump elements for progressively varying the quantity of liquid contained in said pump elements, the quantity of liquid contained in and discharged from said pump elements being the determining factor producing the braking effect thereof, an individually-adjustable, yieldingly-mounted valve arranged in each of said passageways and adapted automaticaly to seat in the presence of a determined minimum pressure in said passageway and to obstruct the flow thru said passageway, said minimum pressure being sufficient to lock the running gear to which said braking elements are secured.

CLIFFORD H. ROGERS.